Patented Sept. 12, 1922.

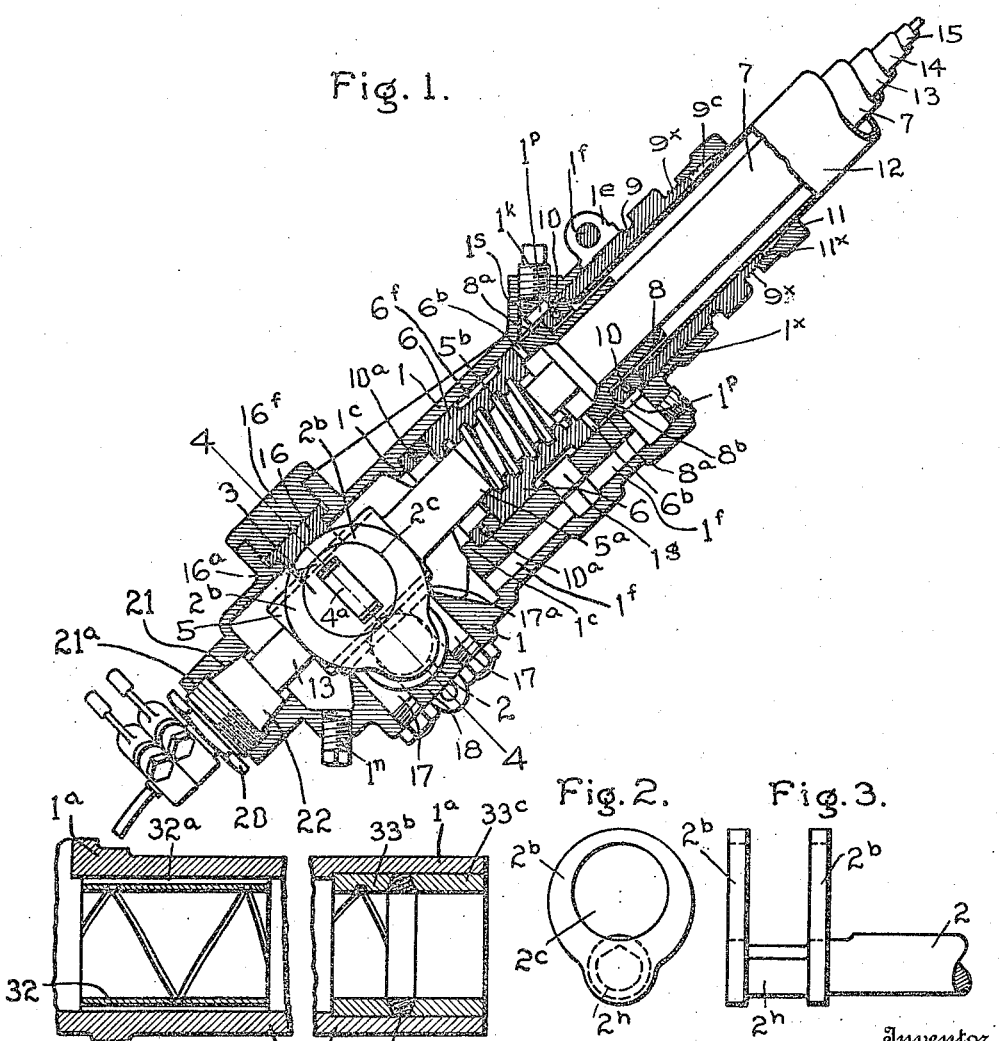

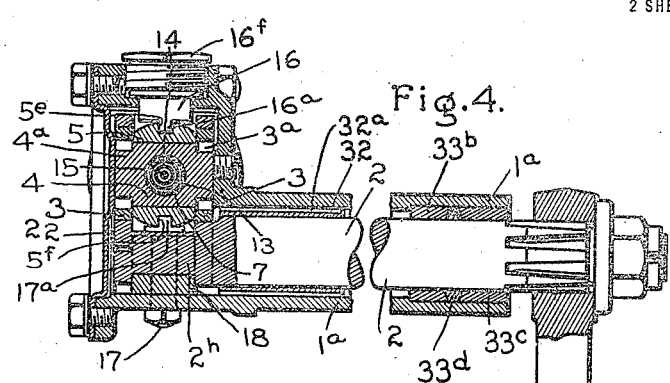
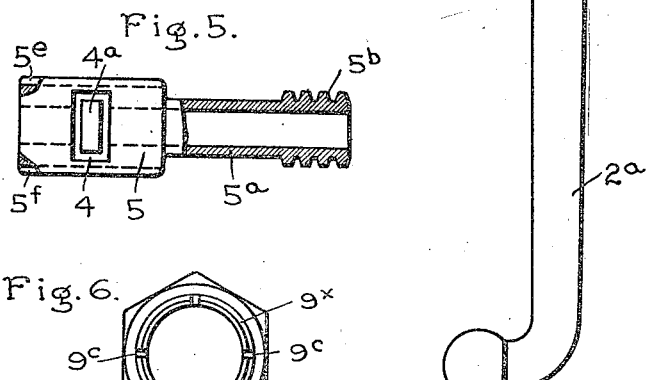
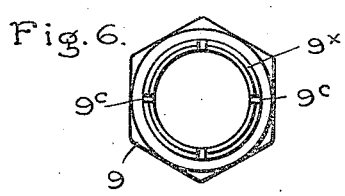
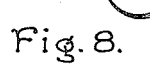
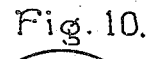
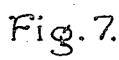
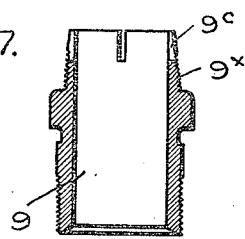
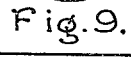
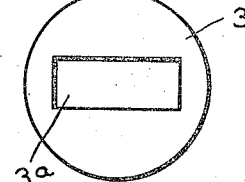
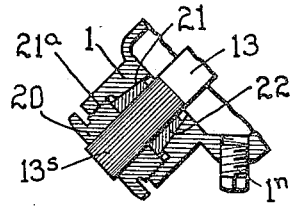
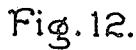

1,429,103

UNITED STATES PATENT OFFICE.

DAVID E. ROSS, OF LAFAYETTE, INDIANA, ASSIGNOR TO ROSS GEAR & TOOL COMPANY, OF LAFAYETTE, INDIANA, A CORPORATION OF INDIANA.

STEERING GEAR.

Application filed November 4, 1921. Serial No. 512,878.

*To all whom it may concern:*

Be it known that I, DAVID E. Ross, a citizen of the United States, residing at Lafayette, in the county of Tippecanoe and State of Indiana, have invented certain new and useful Improvements in Steering Gears; and I hereby declare that the following is a full, clear, and exact description thereof, reference being had to the accompanying drawings, which form part of this specification.

This invention is a novel steering gear of the type shown in my Patent #1,331,026, dated February 17, 1920, and is especially designed for use on passenger automobiles and trucks. The invention provides an improved steering gear which can be easily operated; will be strong, durable and reliable in action; will securely hold the steering shaft in any adjusted position; will be very compact and light; and can be readily applied to any of the standard passenger cars.

In particular the invention provides novel operative connections between the actuating member and the rocker shaft; a novel construction of the casing; novel means for oiling the working parts; novel means for fastening the sector tube in the lower part of the casing and preventing leakage of oil thereat or turning of the sector tube; and novel means for preventing escape of oil at the outer end of the trunnion shaft or rocker arm. Minor objects of the invention and novel features thereof will be hereinafter set forth.

The accompanying drawings illustrate one practical steering gear embodying the invenion, and I will describe in detail to enable others to understand and use the invention;
but I do not consider the invention restricted to the specific construction shown in the drawings, and therefore refer to the claims for summaries of the essentials of the invention and of the novel features of construction and novel combinations of parts for all of which protection is desired.

In the drawings:

Fig 1 is a sectional elevation of the complete gear—the steering wheel being broken away.

Fig. 2 is an end view of the rocking shaft.

Fig. 3 is a detail side view of Fig. 2.

Fig. 4 is a section on the line 4—4 Fig. 1.

Fig. 5 is a view of the actuating member detached and partly in section.

Fig. 6 is a top plan view of sleeve 9 detached.

Fig. 7 is a sectional view of such sleeve.

Fig. 8 is an enlarged detail view of one of the bolts 17 detached.

Fig. 9 is an enlarged detail view of the guide 16 detached.

Fig. 10 is an enlarged view of one of the disks 3 detached.

Fig. 11 is an enlarged detail view of one of the actuating blocks 4.

Fig. 12 is a detail section showing the oil seal connection between the control sector tube and the casing.

Fig. 13 is an enlarged detail section through the rocker shaft bearings showing the oil seal.

As shown in the drawings the operative parts of the gear are placed in a suitable housing or casing which may be of any desired exterior form or finish, that shown being preferred. The casing as shown has a longitudinally disposed cylindric body portion 1 in which is mounted the major operative parts of the gear, and has a laterally projecting tubular part 1ª in which the rocker shaft 2 is mounted, the part 1ª being preferably cast integral with the body. An opening may be made in the side of the body directly opposite the part 1ª, which opening can be closed by a removable plate 22 securely bolted to the body 1 as indicated in Fig. 4.

The rocker shaft 2 may be of any suitable construction, and carries a steering arm 2ª which may be fastened to the shaft in any suitable manner; preferably as shown in my Patent No. 1,136,557 dated April 20, 1915. On the end of this rocker shaft within the casing are mounted a pair of parallel arms 2ᵇ, which may be formed with the shaft or separate and rigidly attached thereto. These arms are provided with circular openings 2ᶜ in which are placed metal disks 3 which are accurately fitted to and within the openings in the arms.

Each disk 3 is provided with a diametrically disposed slot 3ª which is engaged by a lug or pin on or connected with a longitudinally movable actuating member 5 which is disposed in the casing at right angles to the rocker shaft and extends between the arms 2ᵇ of said shaft.

Preferably a block 4 of hard metal is inserted in a transverse opening in the actuating member and has lugs 4ᵃ on its ends engaging the slots in the disks, as shown.

Preferably the actuating member 5 is flattened on its sides adjacent shaft 2, so as to fit neatly between arms 2ᵇ, and the disks 3 lie close to the sides of the member 5 and within the arms, as shown. Said member 5 has a shank 5ᵃ which extends into the portion 1 of the casing and is provided with an exterior worm-thread 5ᵇ which is engaged by a correspondingly internally threaded nut 6 rotatably mounted within the part 1 of the casing.

In this invention the actuating member 5 is non-rotating but longitudinally movable and the nut 6 is rotatable but not longitudinally movable, the construction in this particular being similar to that shown in my aforesaid Patent #1,331,026. In the construction when the nut 6 is turned the actuating member 5 will be moved longitudinally in the casing and at right angles to the rocker shaft 2.

The actuating member 5 must not rotate with the nut 6. Arms 2ᵇ would prevent member 5 thus turning but I preferably provide independent means to keep member 5 from turning, and to obviate binding of member 5 by or between the arms 2ᵇ.

In the construction shown member 5 is provided on its upper side adjacent shaft 2, with a longitudinal groove 5ᵉ (Fig. 5) and on its lower side with a longitudinal groove 5ᶠ. The groove 5ᵉ is engaged by a rib 16ᵃ on a block or member 16 (see Fig. 9) which is inserted in the bottom of an opening in the top of the casing opposite the rocker shaft 2; and which opening may be closed by a screw cap 16ᶠ, which holds the member 16 securely in position with the rib 16ᵃ projecting into the groove 5ᵉ in the actuating member 5.

A semi-cylindric bushing 18 is placed in the casing against the underside of the rocker shaft and between the arms 2ᵇ to take the load off the central line of the gear and is secured in position by bolts 17, which pass through openings in the casing.

Preferably the underside of the rocker shaft between the arms 2ᵇ is slightly reduced in diameter as indicated at 2ʰ in Figs. 2, 3, and 4 and the bushing 18 is fitted to this reduced portion of the rocker shaft. The bolts 17 which retain this bushing in position preferably have ribs 17ᵃ (see Fig. 8) on their heads, within the casing which engage the groove 5ᶠ in the member 5 and assist in guiding said member and prevent its rotating.

When the nut is turned by the steering shaft the actuating member travels up or down in the casing and by the engagement of the disks 3 with the openings in the arms rocks the trunnion shaft and turns the steering arm. There is only a very slight rotative movement of the disks 3 in the arms 2ᵇ and the disks have only a slight lateral movement longitudinally of the member 5 and transversely of the shaft 2.

The rectangular slots in the disks are long enough to permit the blocks 4 to move the disks transversely of the center line of the actuating member 5, as required between the opposite extreme limits of rocking movement of the arms 2ᵇ. The resulting action is that when the nut is turned by the steering wheel the actuating member moves up or down according to the rotation of the nut. In so doing it carries the block 4 which moves the disks 3 and the disks cause the arms 2ᵇ to rock the shaft 2, and thus move the steering arm forward or backward, and hold it securely in any adjusted position.

The steering shaft 7 may be tubular and of the usual construction and may be connected with the nut in any suitable manner so as to turn the same. Preferably a collar 8 is rigidly secured to or formed on the lower end of shaft 7 and has radially disposed arms 8ᵃ respectively adapted to engage corresponding recesses 6ᵇ in the upper end of the nut 6; thus insuring that the nut will turn with the steering shaft, and not requiring brazing of the nut to the steering shaft.

Collar 8 is journaled in the lower part of a sleeve 9 which is exteriorly threaded to engage corresponding interior threads 1ˣ in the upper end of the part 1 of the casing. Preferably an annular ball-thrust-bearing 10 is interposed between the inner end of the sleeve 9 and a flange 8ᵇ on the inner end of the collar 8; and a similar ball thrust bearing 10ᵃ is interposed between the inner or lower end of the nut 6 and a shoulder 1ᶜ in the casing, as shown in Fig. 1. By such means the nut 6 can be closely confined against longitudinal movement in the casing 1, while being rotatable therein.

The upper threaded end of the casing 1 is preferably split as shown and provided with ears 1ᵉ connected by a bolt 1ᶠ; and after the sleeve 9 is properly adjusted in the casing it can be securely clamped in position by tightening the bolt 1ᶠ. The upper end of the sleeve 9 projects out of the casing and is externally threaded as at 9ˣ; and the extremity of the sleeve is tapered as indicated at 9ᶜ.

A collar 11 has a threaded portion 11ˣ engaging the threads 9ˣ of the sleeve 9, and said collar is internally conically tapered, oppositely to the taper of the part 9ᶜ of the bushing to engage the latter.

The end of the steering shaft jacket, or tube 12 is first entered into the upper end of the sleeve 9 (see Fig. 1) then the collar 11 is screwed onto the threaded outer portion of said sleeve and the tapered portion of the collar engaging the tapered split end of the sleeve causes the latter to tightly clamp the end of the tube 12 and hold it securely. This construction forms a simple and efficient means of fastening the tube to the casing.

The steering shaft 7 is preferably hollow, and the actuating member 5 preferably has an axial bore extending longitudinally therethrough, also block $4^a$ has a transverse hole extending therethrough as indicated at $4^d$ (see Fig. 11) so that the throttle control tube 13, spark control tube 14, and electric cable 15, may be passed through the steering shaft and steering gear as usual.

To insure thorough lubrication of the working parts the casing 1 is provided near its upper end with an interior annular recess $1^s$ which communicates by a radial port $1^p$ with a longitudinal passage $1^f$ in the wall of the casing, which conducts the oil into the interior of the casing above the rocker shaft 2 and below the bearing $10^a$ as shown in Fig. 1. This passage $1^f$ also communicates by a lateral port $1^g$ with an annular groove $6^f$ in the nut 6 so as to insure lubrication thereof. The oil may be supplied to the upper side of the recess $1^s$ through an opening closed by a screw plug $1^k$. The oil can be drained out of the casing if desired through an opening normally closed by plug $1^n$.

The lower end of the casing through which the control tubes pass should be suitably closed so as to prevent any leakage of oil from the casing around the control tube. I prefer to employ the novel means illustrated in the drawings for fastening the sector tube 7 in the casing and at the same time forming an oil tight joint or seal around the same so as to prevent leakage of oil from the casing.

As shown in Figs. 1 and 12, in the lower end of the housing or body 1, and in axial alinement with the steering shaft 7, is an opening for the passage of the control sector tube 13, which opening is larger than said tube and is tapered, as indicated at 21, and within this tapered opening is inserted an oppositely tapered bushing 22 which is preferably formed of low fusible metal and cast onto the lower part of the sector tube 13. The lower part of the sector tube is preferably externally longitudinally grooved or serrated as shown at $13^s$ Fig. 12.

Exterior to the conical portion 21 of the opening is an enlarged annular nut or gasket 20 the inner end of which engages the outer end of the bushing 22; by tightening the nut 20 the conical bushing is forced into the conical recess 21 and closely binds in the opening and around the tube 13, and prevents the sector tube 13 from turning in the casing and also forms an oil tight seal around this tube and between it and the casing, effectively preventing any leakage of oil around the sector tube at the lower part of the casing.

The rocker shaft is preferably journaled in a bushing 32 at the inner end of the extension $1^a$ and in bushings $33^b$ and $33^c$ adjacent the outer end thereof. The bushing 32 is provided with longitudinal oil passage grooves $32^a$. The bushing $33^b$ is preferably tightly pressed into an annular recess in the outer end of the extension $1^a$, then a washer $33^d$ preferably of felt or compressible material is inserted in the recess, and then the outer or compression bushing $33^c$ is inserted in the recess. To prevent oil escaping through the tubular extension $1^a$; the adjacent inner ends of the bushings $33^b$ and $33^c$ are oppositely beveled, as shown, and engage corresponding but oppositely beveled sides of the washer $33^d$; so that when the parts are in place and the outer or compression bushing $33^c$ is forced inward the washer $33^d$ is compressed laterally and caused to closely bind between the inner wall of the extension and the rocker shaft and thus effectively prevent any leakage of oil from the tubular extension $1^a$ of the steering gear casing.

The bushings 32 and $33^d$ may be provided with internal oil grooves as usual; but the bushing $33^c$ is not grooved, as no oil can pass beyond the washer or gasket $33^d$. The bushing $33^c$ preferably has a press fit in the end of the extension $1^a$ so that when forced home it will be securely retained in position therein, but if desired it may be secured in the extension in any desired manner.

The present invention provides such a large extent of bearing surfaces between the bearing members as insures reliability and safety of the operative members and also easy steering by the gear. The operating disks move edgewise in the casing and are carried in the rocker shaft arms and entirely enclosed.

The casing can be filled with oil to insure lubrication of the working parts and by reason of the large bearing surfaces and the perfect lubrication of parts in this novel construction, there is practically no wear on the threads.

The gear shown can be made 2 inches wide at its lower part, and the upper part of the housing, which also contains the ball thrust bearings, $2\frac{1}{2}$ inches in outside diameter which renders the complete gear very narrow and enables it to be easily installed in any ordinary passenger car.

What I claim is:

1. In a steering gear the combination of a casing, a slidable actuating member therein having a threaded portion, a rotatable nut mounted in said casing engaging the threaded portion of the actuating member, a steering shaft for operating the nut, means for preventing longitudinal movement of the nut in the casing, a rocker shaft journaled in the casing at substantially right angles to the actuating member, an arm on the rocker shaft projecting beside the actuating member, a disk mounted in said arm, and means on the actuating member engaging said disk whereby when the nut is rotated the actuating member is reciprocated and the rocker shaft rocked, substantially as described.

2. In a gear as set forth in claim 1, the arm on the rocker shaft having a circular opening and the disk mounted in the opening having a diametrical slot engaged by the means on the actuating member, substantially as described.

3. In a gear as set forth in claim 1, the actuating member having a transverse opening and a block in said opening having its end engaged with the disk in the arm, substantially as described.

4. In a gear as set forth in claim 1, the disk in the arm having a diametrical slot, and a block in the actuating member having a projecting end engaging the slot in the disk.

5. In a gear as set forth in claim 1, a casing having an oil supply recess adjacent its upper end and an oil passage extending from this recess to a point adjacent and above the rocker shaft and opening into the casing above the rocker shaft, substantially as described.

6. In a steering gear the combination of a casing, a slidable actuating member therein having a longitudinally grooved portion and a threaded portion, means engaging the grooved portion of the actuating member to prevent rotation of said member, a rotatable nut mounted in said casing engaging the threaded portion of the actuating member, means for preventing longitudinal movement of the nut in the casing, a steering shaft for operating said nut, a rocker shaft journaled in the casing at substantially right angles to the actuating member, and means comprising arms on the rocker shaft having circular openings, and disks mounted in the openings having diametrical slots connected with the actuating member whereby when the nut is rotated the actuating member is reciprocated and the rocker shaft rocked, substantially as described.

7. In a gear as set forth in claim 6, the actuating member having a transverse opening and a block in said opening having its ends engaged with the arms, substantially as described.

8. In a gear as set forth in claim 6, disks in the arms having diametrical slots and a block transfixing the actuating member and having rectangular ends engaging the slots in the disks.

9. In a steering gear as set forth in claim 6, the casing having an oil supply recess at its upper end above the nut and an oil passage extending from this recess to a point adjacent and above the rocker shaft and opening into the casing above the rocker shaft, said nut having an annular groove, and a port leading from the oil channel to the groove in the nut.

10. In a steering gear the combination of a casing, a longitudinally movable actuating member therein, a steering shaft, and threaded means whereby the actuating member is moved longitudinally when the steering shaft is turned, with a rocker shaft journaled in the casing at substantially right angles to the actuating member, arms on said shaft projecting beside the actuating member, and having circular openings, disks in said openings, and members on the actuating member engaging said disks.

11. In a gear as set forth in claim 10, the disks having diametrical slots connected with the actuating member, substantially as described.

12. In a gear as set forth in claim 10, the actuating member having a transverse opening and a block in said opening having its ends engaged with the disks in the arms, substantially as described.

13. In a gear as set forth in claim 10, the disks in the arms having diametrical slots and a block transfixing the actuating member having rectangular ends engaging the slots in the disks.

14. In a steering gear as set forth in claim 10, the casing having an oil supply recess at its upper end above the nut and an oil passage extending from this recess to a point adjacent and above the rocker shaft and opening into the casing above the rocker shaft, substantially as described.

15. In a steering gear, a casing, a slidable actuating member therein, a rotatable member engaging said actuating member, means for preventing longitudinal movement of the rotatable member in the casing, a steering shaft connected with the rotatable member, a sleeve entering the casing to confine the rotatable member therein, said sleeve having a split and tapered end, a steering shaft casing entering said sleeve, and a tapered collar exterior to the steering sleeve casing engaging the tapered end of the sleeve and clamping the same upon the casing.

16. In a steering gear of the character set forth having an actuating member, provided with a longitudinal groove; and a member secured in the casing having a rib engaging the longitudinal groove in the actuating member, substantially as described.

17. In a steering gear, a casing, a longitudinally movable actuating member therein provided with a longitudinal slot, and a bolt entering the casing having a rib on its end engaging the slot in the actuating member to prevent rotation thereof.

18. In a steering gear, a casing, a longitudinally movable actuating member therein having a threaded portion, a rotatable member in the casing engaging the threaded portion of the actuating member, means for preventing longitudinal movement of the rotatable member in the casing, a sleeve entering the casing to retain the rotatable member therein, said sleeve having a split outer end, a steering shaft entering the casing, means on the inner end of said steering shaft engaging the slots in the adjacent end of the nut to rotate the latter with the steering shaft, a steering shaft casing entered in the sleeve, and a tapered collar screwed onto the outer end of the sleeve causing same to clamp the steering shaft casing, substantially as described.

19. In a steering gear the combination of a casing, a longitudinally movable actuating member therein, a steering shaft and threaded means whereby the actuating member is moved longitudinally when the steering shaft is turned; with a rocker shaft journaled in the casing at substantially right angles to the actuating member, and means whereby the rocker shaft is rocked by the actuating member, and a bushing within the casing engaging the rocker shaft opposite the actuating member to take lateral thrust off the shaft.

20. In a steering gear, a casing, a slidable actuating member therein having a threaded portion, a nut rotatably mounted in the casing and engaging said threaded portion; means for preventing longitudinal movement of the nut in the casing, a steering shaft connected with the nut, a sleeve entering the casing to confine the nut therein, said sleeve having a split and tapered end, a steering shaft casing entering said sleeve, and a tapered collar exterior to the steering sleeve casing engaging the tapered end of the sleeve and clamping the same upon the casing.

21. In a steering gear as set forth in claim 20, the casing having an annular oil supply recess at its upper end above the nut and an oil passage extending from this recess to a point adjacent and above the rocker shaft and opening into the casing above the rocker shaft, said nut having an annular groove, and a port leading from the oil channel to the groove in the nut.

22. In combination with the parts as set forth in claim 20, a rocker shaft mounted in the casing at substantially right angles to the actuating member, arms on said rocker shaft at opposite sides of the actuating member, and members connected with the actuating member and engaging said arms, substantially as described.

23. In combination with parts as set forth in claim 20, a rocker shaft mounted in the casing at substantially right angles to the actuating member, arms on said rocker shaft at opposite sides of the actuating member provided with circular openings, disks in said openings provided with slots, and a block transfixing the actuating member and having its ends engaging the slots in the disks.

24. In a steering gear, a casing, an actuating member therein having a threaded portion, a rotatable nut in the casing engaging the threaded portion of the actuating member, means in the casing for preventing inward movement of the nut, a sleeve screwed into the casing to retain the nut therein, said sleeve having a split outer end, a steering shaft entering the casing, a collar connected with the inner end of said steering shaft and having radial lugs engaging corresponding slots in the adjacent end of the nut to rotate the latter with the steering shaft, a steering shaft casing entered in the sleeve, and an internally tapered collar screwed onto the tapered outer end of the sleeve to cause same to clamp the steering shaft casing, substantially as described.

25. In combination with parts as set forth in claim 24, a rocker shaft mounted in the casing at substantially right angles to the actuating member, arms on said rocker shaft at opposite sides of the actuating member provided with circular openings, disks in said openings provided with slots, and a block transfixing the actuating member and having rectangular ends engaging the slots in the disks.

26. In a steering gear as set forth in claim 24, the casing having an annular oil supply recess at its upper end above the nut and an oil passage extending from this recess to a point adjacent and above the rocker shaft and opening into the casing above the rocker shaft, said nut having an annular groove, and a port leading from the oil channel to the groove in the nut.

27. For a steering gear a casing having an annular oil recess near its upper end provided with a filling opening, and a channel in the lower side wall of the casing leading from said recess and opening into the lower part of the casing to supply oil to the bearings of the rocker shaft, and a port leading from the oil channel into the casing between the recess and the lower end of the channel.

28. In a steering gear a casing, a slidable actuating member therein, a rotatable member engaging said actuating member, a steer-